US006469266B2

(12) United States Patent
Taylor

(10) Patent No.: US 6,469,266 B2
(45) Date of Patent: Oct. 22, 2002

(54) ROAD VEHICLE AXLE SENSOR

(75) Inventor: Brian Taylor, Saskatoon (CA)

(73) Assignee: International Road Dynamics Inc., Saskatoon (CA)

( * ) Notice: Subject to any disclaimer, the term of this patent is extended or adjusted under 35 U.S.C. 154(b) by 40 days.

(21) Appl. No.: 09/801,813

(22) Filed: Mar. 9, 2001

(65) Prior Publication Data

US 2002/0050917 A1 May 2, 2002

(30) Foreign Application Priority Data

May 30, 2000 (CA) .............................................. 2310149

(51) Int. Cl.[7] .......................... H01H 3/02; H01H 11/00; B29B 13/00

(52) U.S. Cl. ................. 200/86 A; 200/86 R; 264/271.1

(58) Field of Search ............................ 200/86 R, 86 A, 200/85 R, 512–517; 264/239–279.1; 29/622

(56) References Cited

U.S. PATENT DOCUMENTS

| | | | | | |
|---|---|---|---|---|---|
| 1,725,963 | A | | 8/1929 | Morris | |
| 2,067,336 | A | | 1/1937 | Paver | 235/92 |
| 2,251,351 | A | * | 8/1941 | Cooper | 264/277 |
| 2,375,178 | A | | 5/1945 | Ruben | 201/50 |
| 2,611,049 | A | | 9/1952 | Roby | 200/86 R |
| 2,823,279 | A | | 2/1958 | Schulenburg | 200/86 R |
| 2,909,628 | A | | 10/1959 | Cooper | 200/86 R |
| 3,385,067 | A | | 5/1968 | Costanzo | 338/100 |
| 3,748,443 | A | * | 7/1973 | Kroll et al. | 200/86 R |
| 3,806,471 | A | | 4/1974 | Mitchell | 252/518 |
| 3,818,162 | A | * | 6/1974 | Monroe et al. | 200/86 R |
| 3,835,449 | A | * | 9/1974 | Viracola | 200/86 A |
| 4,044,642 | A | | 8/1977 | Pearlman et al. | 84/1.1 |
| 4,315,238 | A | | 2/1982 | Eventoff | 338/99 |
| 4,347,505 | A | | 8/1982 | Anderson | 340/666 |
| 4,489,302 | A | | 12/1984 | Eventoff | 338/99 |
| 4,656,454 | A | | 4/1987 | Rosenberger | 338/2 |
| 4,782,319 | A | | 11/1988 | Dell'Acqua et al. | 338/4 |
| 4,799,381 | A | * | 1/1989 | Tromp | 73/146 |
| 4,963,705 | A | * | 10/1990 | Broderick et al. | 200/86 R |
| 5,239,148 | A | | 8/1993 | Reed | 200/86 A |
| 5,360,953 | A | | 11/1994 | Reed | 200/86 A |
| 5,710,558 | A | * | 1/1998 | Gibson | 200/85 R |

* cited by examiner

*Primary Examiner*—J. R. Scott
(74) *Attorney, Agent, or Firm*—Nixon & Vanderhye P.C.

(57) ABSTRACT

An improved vehicle road sensor is provided for signalling the passage of a vehicle over a predetermined location on a roadway. The vehicle road sensor includes a membrane switch which includes a first member and a second member. The first member includes a non-conductive substrate, a pair of electrically-conductive stripes upon the non-conductive substrate, an electrically non-conductive gap separating the electrically-conductive stripes, and an electrically-conductive lead connected to each electrically-conductive stripe. The second member includes an electrically-conductive strip which is superposed upon the electrically-conductive stripes on the first member. The second member is normally out of electrical contact with the electrically-conductive stripes on the first member. The second member is sufficiently flexible, so that, under a compressive load, it deflects to shunt across the electrically non-conductive gap, thereby to permit electric current to flow from the electrically-conductive stripes to the second member. Various arrangements of separate, but connected sensitive zones may be provided along the length of the sensor. Vehicle wheels of different widths would activate a different number of active sections, thereby approximating tire widths, for detecting the presence of one tire or two tires.

30 Claims, 3 Drawing Sheets

ROAD VEHICLE AXLE SENSOR

BACKGROUND OF THE INVENTION (a) Field of the Invention

This invention relates to a sensing device which preferably is flush with the surface of a road, for sensing the passage of vehicles over the device and, if connected with a properly programmed computer, determines the presence of the vehicle passing over the device.

(b) Description of the Prior Art

Government agencies often require the submission of reports concerning truck travel at specific locations on roadways before authorizing funding for the repair and improvement of such roadways. A number of classifying machines are currently used to provide such reports concerning truck travel. Typically, they require two axle detector inputs which are positioned a known distance apart. The classifying machine measures the time interval between axles, calculates the speeds at which the axles are travelling, counts the number of axles travelling at the same rate of speed, and then, depending upon results, records the vehicle type in a predetermined classification bin. Such studies are typically undertaken over a continuous 24 hour period and are broken down into one hour increments. Portable axle detectors which are manufactured and are presently available vary greatly in cost, durability, limitations of operation and set up procedure difficulty.

One common type of such portable axle deflector was a pneumatic road tube which was laid across the roadway. Rubber pneumatic road tubes created an air pulse when impacted by a tire. The air pulse was sensed by a counting machine and treated as an axle actuation.

Such detectors were relatively easily damaged in use. In addition, they were not capable of producing sophisticated indications of location of the vehicle wheel on the road or vehicle speed data. Moreover, when the road tube was placed across multiple lanes, it was not possible for the counting machine to discriminate from which lane the air pulse originated. In order to accomplish such lane discrimination, air tubes were typically tied off so that only tire impacts by traffic in a specific lane created an air pulse to be counted. In order to obtain a count for each of the multiple lanes, it was necessary to use separate air pulse to be counted. In order to obtain a count for each of the multiple lanes, it was necessary to use separate air pulse counting machines for each lane. Excess costs resulted from the duplication of equipment and the lengthy set up time required. In addition, vehicles travelling at low speeds across the road tubes sometimes failed to create an air pulse which was strong enough to be sensed. As a result, human classifiers were often also needed to avoid inaccurate traffic counts.

Electrical contact systems or treadle switches have also been used in counting operations, particularly in multiple lane vehicular traffic counting applications.

Examples of early patents for such sensors include the following:

U.S. Pat. No. 1,125,963, patented Aug. 27, 1929 by H. I. Morris, provided a switch, including a body of material, and electrically-conductive contacts having portions which were embedded in the material. Portions in superposed relation were arranged to contact one with the other when the body was compressed. Means were connected with the contacts to permit connection with an external circuit. Compressible means were interposed between portions of the contacts which normally maintained their contacting portions out of contact.

U.S. Pat. No. 2,067,336, patented Jan. 12, 1937, by Paver, disclosed a deformable strip with flat bottom and an inclined approach to the top. Pressure exerted by traffic deformed the strip by pressing the deformable strip and spacer locks at one or more points so as to bring strips into electrical contact at one or more places. Each of the contact strips was connected to a separate counter or recorder using connector strips which carried a plurality of flexible wires, in order to obtain a separate count for each traffic lane. One problem was that the spaced strips which were made of resilient metal, e.g., phosphor bronze, were held in separated relation by resilient or compressible spaced members in the form of short blocks of sponge rubber. Even through both the rubber and the spaced strips were resilient, the inability of the strips to move within the surrounding sponge rubber caused them to undergo significant stresses which reduced traffic cord life and caused early failures.

U.S. Pat. No. 2,611,049, patented Sep. 16, 1952, by S. S. Ruby, assigned to The Stanley Works, provided a switch including three superposed, generally-parallel imperforate sheet metal plates. The upper two plates were sufficiently flexible and resilient to permit flexing responsive to predetermined operating pressures to effect engagement between at least two of three plates. A plurality of spaced-apart, thin, non-conducting elements which were disposed on each side of the intermediate plate separated the plates in superposed parallel relationship. The elements between the bottom and intermediate plates were disposed in staggered relationship with respect to the elements between the intermediate and top plates. Means were provided for forming a first electrical connection with the intermediate plate and a second electrical connection jointly with the top and bottom plates.

U.S. Pat. No. 2,823,279, patented Feb. 11, 1958 by E. S. Schulenburg disclosed a strip that was adapted to be buried in the road. It had a switch construction in which upper and lower switch contacts were mounted to contact strips so that a contact was moved into engagement with another contact when the wheel of a vehicle depressed the top wall of the tube. The contact strips were supported by resilient fingers which maintained the separation of contacts when vehicle pressure was not present. The lower resilient fingers acted as a strain release to prevent undue pressure from being applied to the contact strips and to the contacts. The tube housing had a hollow interior into which these contacts and contact strips were assembled.

U.S. Pat. No. 2,909,628, patented Oct. 1959 by Cooper, disclosed a treadle switch with a common contact strip affixed to an upper portion of an envelope forming the top wall of a hollow longitudinal pocket in a rubber envelope. A single contact strip was positioned under the common contact strip. Segments were spaced one from the other in aligned relation and were moulded with conductors embedded therein. The conductors were connected to respective contact segments. The angular shape of the contact segments was an important design factor. Cooper relied on the inherent resiliency of the rubber envelope to flex the contact strip sequentially to make contact with each of the contact segments. In addition, a cable-like, piezo-type axle sensor had been used. Generally, this consisted of a central, or inner conductor which was surrounded by a piezo ceramic material which, in turn, was surrounded by an outer tubular conductor. Pressure on the cable-like sensor caused an electrical signal to flow between the conductors, the signal being proportional to the amount of pressure. However, this sensor was prone to false signals because the round cable was susceptible to pressure from any direction, including pressure from pavement movement, heavy weights and poor truck suspension systems. Also, it functioned poorly under light pressure from light vehicles, since piezo material was a rate-of-change, or speed-dependent material.

U.S. Pat. No. 4,782,319, patented Nov. 1, 1988 by R. Dell'Acqua et al, assigned to Marelli Autronics SpA, provided a pressure sensor including a rigid support, a diaphragm having a peripheral portion fixed by a layer of glue to the support, and a central portion spaced from the support. At least one thick-film resistor acted as a piezo-resistive transducer and was carried by the diaphragm on its surface facing the support. The diaphragm was able to deform resiliently towards the support when a pressure was exerted on its other surface. The surface of the support which was connected to the diaphragm was flat. The layer of glue had a calibrated thickness such that the distance between the diaphragm and the surface of the support at rest was substantially-equal to the deflection of the diaphragm corresponding to the predetermined maximum pressure measured. The diaphragm contacted and was supported by the support when it was subjected to the predetermined maximum pressure.

Compression or force sensitive resistors have now become available. These force sensitive resistors or semiconductors normally resisted the flow of electrical current, but permitted the flow in proportion to pressure which was applied to the resistor. That is, by squeezing or compressing the resistor, it became less resistant to the flow of current so that the flow of current can be measured by a suitable detector. The flow of current indicated the fact of the application of pressure as well as the amount of pressure and, also, the location of the pressure upon a particular resistor.

Examples of patents directed to such concepts include the following:

U.S. Pat. No. 2,375,178, patented May 1, 1945, by S. Ruben, provided a variable electrical resistor. The resistor was a glass fibre mat of criss-crossing thin glass fibres with colloidal graphite baked thereon to bond the glass fibres.

U.S. Pat. No. 3,386,067, issued May 28, 1968 to R. S. Costanzo, disclosed analog switches which sandwiched a fibrous or sponge-like layer containing a conductive material between two conductor plates. As the two conductor plates were compressed together, the number of electrically-conductive paths through the sandwiched layer volume increased, thus decreasing the electrical resistance through that layer. The resistive sandwich layer was resilient to force the electrodes apart and to disconnect most of the conductive paths when the compression force was released. The semiconducting sandwiched layer depended on macroscopic compaction to increase the number of electrical conductive paths between the upper and lower conductor plates. In such devices, the resiliency of the fibrous or sponge-like layer can decrease with use, thus causing a degeneration in the operating characteristic of the switch.

U.S. Pat. No. 3,806,471, issued Apr. 23, 1979, to R. J. Mitchell, provided a pressure responsive semiconductor material, e.g., molybdenum disulfide which was placed between conductor plates to provide an adjustable resistor or transducer. Mitchell relied on volume resistance, that is, the resistance through a relatively thick volume of the molybdenum disulfide layer. The structure disclosed by Mitchell required that the. semiconducting volume be positioned between two electrodes or conductors or otherwise be positioned between a conductor and a nonconductive plate or member so that the semiconducting composition layer did not have any exposed surfaces but rather was in intimate contact with either the insulative plate or the conductors.

U.S. Pat. No. 4,044,642, issued Aug. 30, 1977, to A. P. Pearlman, disclosed a touch-sensitive resistance device for use in musical instruments. The device used a semiconductor material which was sandwiched between two conductor plates. Specifically, Pearlman, et al. used a resilient material, e.g., foam rubber or foamed synthetic polymeric material which had a particulate material, e.g., graphite dispersed throughout. The switch structure had a foam semiconductor layer and an insulator layer with an orifice therethrough sandwiched between two conductor plates. Thus, when a compression force was applied, the graphite-saturated resilient foam layer deformed into the orifice in the insulator material initially to make electrical contact, thereby to switch the musical instrument on. Thereafter, additional compression force caused the resistance between the two conductor plates to decrease, thereby altering the volume or tonal quality produced. However, a degradation in mechanical resiliency of the semiconductor layer caused a degeneration in switch performance.

U.S. Pat. No. 4,315,238 patented Feb. 9, 1982, by F. N. Eventoff, provided a pressure responsive analog switch having a resistance which varied inversely to the amount of compression force applied to the switch. Specifically, the analog switch had a base member on which first and second spaced contact conductors were disposed. An insulative spacer was positioned on the base member around the contact conductors with a cover fixed to the insulative spacer, spaced above the contact conductors. The space between the cover and the contact conductors defined an enclosure, which was surrounded on its sides by the spacer. The cover was resiliently movable toward the contact conductors in response to an external compression force. A pressure-sensitive semiconductor ply was positioned in the enclosure between the cover and the contact conductors for providing a variable resistance path between the first contact conductor and the second contact conductor when the cover was moved into physical contact with them. The resistance of the pressure-sensitive semiconductor ply varied in response to variations in the externally-applied compression force. A passageway was provided between the enclosure and the external region of the analog switch for allowing free airflow into and out of the enclosure when the cover moved away from or towards the contact conductors. The semiconducting composition layer had at least one contact surface which was not in intimate contact with either a conductor or another semiconducting layer. Such an arrangement facilitated taking advantage of the physical contact resistance over the surface of the composition. Since the variable resistance occurred because of a greater or lesser number of surface contact locations, one surface of the semiconductor layer must be at least initially spaced apart from one of the conducting electrodes or must be in non-intimate contact with the opposing surface. Depression of the conducting electrode against the surface of the thin semiconductor layer resulted in a plurality of contact points being made along the surface. These contact points increased between the conducting plates or contacts on either side of the semiconductor layer. The surface contact semiconductor layer was made of any suitable semiconductor material.

U.S. Pat. No. 4,347,505, patented Aug. 31, 1982, by G. B. Anderson, assigned to Antroy Enterprises Inc., provided a pressure detecting device which included a circuit, and a thin, resiliently-deformable sheet of semiconductor material having an internal electrical conductivity which was generally invariable according to applied pressure. The surface of the semiconductor material had microscopic ridges and depressions therein. A first electrode was connected to the circuit and comprised a flexible sheet of electrically-conductive metal foil, e.g., copper, steel, aluminum or alloys thereof, which was in mechanical contact with one side of the resiliently-deformable sheet material and which was electrically-connected to the circuit. A second electrode was connected to the circuit and comprised a flexible sheet of electrically-conductive metal foil, e.g., of copper, steel, aluminum or alloys thereof, which was in mechanical contact with the other side of the resiliently-deformable semiconductor sheet material and which was electrically connected to the circuit. The circuit was responsive to deforming of the microscopic ridges and depressions in the presence of applied pressure on the first electrode resiliently deformable semiconductor sheet, second electrode combination for providing an output signal that was a function of the applied pressure.

U.S. Pat. No. 4,489,302, patented Dec. 18, 1984, by F. N. Eventoff, provided a pressure-responsive analog switch having a resistance which varied inversely to the amount of compression force applied to the switch. The analog switch had a base member on which first and second spaced contact conductors were disposed. An insulative spacer was positioned on the base member around the contact conductors with a cover fixed to the insulative spacer, which was spaced above the contact conductors. The space between the cover and the contact conductors defined an enclosure which was surrounded on its sides by the spacer. The cover was resiliently movable toward the contact conductors in response to an external compression force. A pressure sensitive semiconductor ply was positioned in the enclosure between the cover the contact conductors for providing a variable resistance path between the first contact conductor and the second contact conductor when the cover was moved into physical contact with them. The resistance of the pressure sensitive semiconductor ply varied to response to variations in the externally-applied compression force. A passageway was provided between the enclosure and the external region of the analog switch for allowing free airflow into and out of the enclosure when the cover moved away from, or towards, the contact conductors.

U.S. Pat. No. 4,656,454, patented Apr. 7, 1987, by M. E. Rosenberger, assigned to Honeywell Inc., provided a pressure transducer assembly comprising: a diaphragm of semiconductor material having a central portion with a piezoresistive device formed thereon and electrically conductive regions extending from the piezoresistive device to a peripheral portion of the diaphragm. A housing contained the diaphragm and had a pressure port therein. The housing had first and second opposing internal surfaces configured to form first and second seats for seals on opposite sides of the diaphragm. First and second elastomeric seals were located between the diaphragm and the first and second seats respectively, each of the seals being moulded in a configuration to extend from the seat on one of the internal surfaces of the housing to a surface of the diaphragm at a location surrounding the central portion thereof. The housing was adapted to hold the first and second seals and the diaphragm between the first and second seats so as to form a pressure tight seal between the housing and the diaphragm on opposite sides thereof. Electrically conductive means were connected to the conductive regions at the peripheral portion of the diaphragm and extended to the exterior of the housing.

U.S. Pat. No. 4,799,381, patented Jan. 24, 1989, by C. M. Tromp, assigned by mesne assignment to International Road Dynamics Inc., provided a vehicle road sensor for signalling the passage of a vehicle over a predetermined location on a roadway. That vehicle road sensor included a force sensing resistor which was formed of a pair of overlapped non-conductive substrates, each having a controllable conductive coating, with the coatings being overlapped in adjacent surface-to-surface relationship. At least one of the coatings was formed of a force-responsive material which was characterized by normally resisting the passage of electrical current therethrough, but whose resistance decreased upon the application of pressure upon the coating. The second of the coatings had at least one area which precluded the passage of electrical current therethrough. That area was overlapped by a portion of the one coating so that the portion functioned to shunt current across the area upon the application of pressure to that portion. The substrates were completely embedded within a block which was formed of a resilient, rubber-like material. That block had an upper, contact surface, with the substrates being embedded within the block beneath the contact surface so that vehicle pressure upon the contact surface was transmitted to the substrates. Means were provided for normally applying an electrical potential to the second coting sufficient to induce the flow of current therethrough when the applied pressure reduces the electrical resistance of that portion. Means were provided for detecting the flow of current through the second coating. The block forming material between the block contact surface and the substrates was resiliently compressible under the weight of a vehicle for temporarily applying enough pressure to the portion of the one coating so that it temporarily functioned as a shunt across the area which it overlapped so that electrical current temporarily flowed through the second coating for indicating the temporary presence of a vehicle upon the block contact surface. The block may be moulded with an elongated channel which stiffened and protected its sides and bottom, but left its upper surface exposed for vehicle contact at the road surface. Pressure of a vehicle upon the exposed upper surface of the block was transmitted to the film or coating beneath the pressurized area so as to permit the film or coating momentarily to become electrically-conductive. Hence, electrical flow momentarily took place across the particular gap area that was located beneath the applied pressure. That electrical flow was detected with a suitable electrical measuring device, e.g., an ammeter or voltmeter or the like, depending upon circuit arrangements. Moreover, the detected signal can be connected to a computer to determine the location of the pressurized area affected and hence, the location of the vehicle along the length of the sensor.

U.S. Pat. No. 5,239,148, patented Aug. 24, 1993, by J. W. Reed, assigned to Progressive Engineering Technologies Corp., provided a traffic counting cord comprising a plurality of sections, a pair of conductive members in each section, and a plurality of insulated conductors in each section. Selected ones of the insulated conductors in the sections were at least partially exposed and made electrical contact with both members of the pair of conductive members in a section under compression by traffic to be counted. Each section had a portion with conductive upper and lower members and a portion with non-conductive upper and lower members. The upper and lower members were separated by resilient, non-conductive upper and lower members. The upper and lower members were separated by resilient, non-conductive material. Embedded within the members were a plurality of wires which were insulated with nylon or other material and at least one non-insulated wire which was in contact with the conductive member. A count occurred when traffic impacting the cord caused the upper and lower members of a section to make contact.

U.S. Pat. No. 5,360,953, patented Nov. 1, 1994, by John W. Reed, assigned to Progressive Engineering Technologies Corp., provided a traffic counting cord including a resilient top portion having at least one resilient conductive member. A resilient lower portion was provided having a plurality of active and passive sections and a plurality of resilient lower portion conductive members which were channelled and interconnected through the lower portion. The lower portion conductive members were separated by nonconductive materials. Each passive section included resilient nonconductive material which was arranged over the conductive members to insulate the lower portion conductive members from the top portion. Each active section included a layer of resilient conductive material at a top of the lower portion, resilient non-conductive material arranged over the lower portion conductive members to insulate the lower portion conductive members from the conductive layer. A communicating conductive material passed through the nonconducting material to connect one of the conductive members to the resilient conducting material on top of the active section. Each section had a portion with conductive upper and lower members and a portion with non-conductive upper and lower members. The upper and lower members were separated by resilient, non-conductive material. Embedded within the members were a plurality of wires insulated with nylon or other material and at least one non-insulated wire which is in contact with the conductive member. A count occurred when traffic impacting the cord caused the upper and lower members of a section to make contact.

SUMMARY OF THE INVENTION

(a) Aims of the Invention

The foregoing types of force sensing resistors were relatively fragile and sensitive. Thus, such resistors would not ordinarily be considered suitable for use in a rugged, relatively-destructive, environment.

A first object of this invention is to provide an inroad vehicle sensor in the form of a sturdy, block or elongated strip, of a resilient, rubber-like material within which a membrane switch is moulded so that the switch is protected against environmental damage and against impact and other damaging forces.

A second object of this invention is to provide such a road vehicle sensor in which a monolithic, rubber-like block which encases the sensor is protected and reinforced against undesirable distortion and heat caused permanent deformations, e.g., by positioning the strip within a metal frame or within a channel-like narrow groove which is cut in the roadway.

A third object of this invention is to provide a detector which may be inserted rapidly, with almost no labour, within grooves which are formed in a roadway, e.g., by arranging these grooves transversely in a road for measuring the passage of vehicles over the road, or arranging these grooves in a road at a particular location to indicate the presence of a vehicle at that location.

A fourth object of this invention is to provide a simplified vehicle detector which is relatively inexpensive in construction, installation and operation, which is essentially maintenance-free and which is resistant to environmental and use damages.

A fifth object of this invention is to provide a detector which reacts only to pressure applied from the top, that is, downwardly-applied pressure, wherein the detection reaction is not dependent upon the speed of the vehicle passing over it.

A sixth object of the invention is to provide such a detector which can detect a single tire or double tires and/or a single axle or double bogey axles.

(b) Statements of Invention

The present invention is based on the concept that a force-sensitive resistor may comprise an elongated, printed circuit strip having electrically-conductive stripes printed upon a substrate, with a repetitive pattern of gap-like areas between the stripes. These areas may be covered by a compression-responsive semiconductor film or coating which is applied upon a non-conductive synthetic plastic substrate. The film or coating may be formed of conductive, metallic micron-size particles contained as a matrix within a suitable non-conductive plastic material. Upon the application of pressure to the film, the resistance to electrical flow through the film decreases or, alternatively, the amount of electrical contact between the film and the conductive stripes increases, so that the film or coating may serve as an electrical shunt across the particular gap area which it overlapped. Consequently, pressure applied upon the device results in current flow through the printed circuit across the gap area beneath the pressure. The amount of pressure and the location of the pressure along the resistor printed circuit can then be detected. Various arrangements of separate, but connected sensitive zones may be provided along the length of the sensor. Vehicle wheels of different widths would activate a different number of active sections, thereby approximating tire widths, for detecting the presence of one tire or two tires.

The invention is thus concerned with a sensing device which utilises a phosphor bronze membrane switch in an outdoor, highly-destructive environment of a road for producing accurate, and repeatable, indications of vehicle passage, velocity and the like useful information.

This invention firstly provides an improvement in a membrane switch assembly for embedment within a block which is formed of a resilient, rubber-like material, for use in a vehicle road sensor for signalling the passage of a vehicle over a predetermined location on a roadway. The membrane switch includes a first member and a second member. The first member includes a non-conductive substrate, a pair of electrically-conductive stripes upon the non-conductive substrate, at least one electrically non-conductive gap separating the electrically-conductive stripes, and an electrically-conductive lead connected to each the electrically-conductive stripe. The second member includes an electrically-conductive strip which is superposed upon the electrically-conductive stripes on the first member. In this aspect of the invention, the second member is normally out of electrical contact with the electrically-conductive stripes on the first member, but is sufficiently flexible, so that, under a compressive load, it deflect to shunt across the electrically-non-conductive gap, thereby to permit electric current to flow from the electrically conductive stripes to the second member.

This invention secondly provides a vehicle road sensor for signalling the passage of a vehicle over a predetermined location on a roadway. The vehicle road sensor includes a membrane switch which is completely embedded within a block which is formed of a resilient, rubber-like material, the block having an upper, contact surface, with the membrane switch being embedded within the block beneath the contact surface so that the vehicle pressure upon the contact is transmitted to the upper surface of the membrane switch. The membrane switch includes a first member and a second member. The first member includes a non-conductive substrate, a pair of electrically-conductive stripes upon the non-conductive substrate, at least one electrically non-conductive gap separating the electrically-conductive stripe, and an electrically-conductive lead connected to each the electrically-conductive stripe. The second member includes an electrically-conductive strip which is superposed upon the electrically-conductive stripes on the first member. In such a membrane switch, the second member is normally out of electrical contact with the electrically-conductive stripes on the first member, but is sufficiently flexible, so that, under a compressive load, it deflect to shunt across the electrically-conductive gap and to permit electric current to flow from the electrically conductive stripes to the second member. A connection is provided for applying an electrical potential to the membrane switch so that the electrical potential is applied to the second member. A detector is provided for detecting the flow of current through the membrane switch. The block-forming material between the contact surface of the block and the second member is sufficiently resiliently-compressible under the weight of a vehicle that it temporarily applies enough pressure to a portion of the strip so that it temporarily functions as a shunt across the electrically-conductive strips of the first member so that electrical current temporarily flows through the membrane switch for indicating the temporary presence of a vehicle upon the block contact surface.

This invention thirdly provides a vehicle road sensor for signalling the passage of a vehicle over a predetermined location on a roadway. The vehicle road sensor includes a conductive membrane switch which is formed of an elongated printed circuit pattern including a pair of separated conductive circuit patterns in the form of conductive printed strips which are printed upon a substrate, and a series of gap areas formed between the strips, with the strips being arranged for normal connection to a source of electrical power, and a pressure-responsive strip overlapping each gap area. A pressure-responsive strip is formed of a material which is normally electrically-conductive so that each strip portion forms an electrical shunt over its overlapping gap area upon the application of sufficient pressure upon the strip. The membrane switch is embedded within an elongated, relatively-narrow block which is made of a resilient, rubber-like material. The block is of a cross-sectional size to fit closely within a saw-cut which is made in a roadway surface so that wheels of a vehicle running over the block apply sufficient pressure upon the block to compress it and thereby to apply sufficient pressure to those strip portions which are located beneath the tires, to shunt across the gaps and to permit electrical current to flow across the gap areas which they overlap and through the strips for detection by a detection means.

This invention fourthly provides a method for making a vehicle road sensor. The method includes preparing a membrane switch from an elongated, narrow substrate having a printed repetitive circuit pattern including elongated, electrically-conductive strips which are separated by defined gap areas. A pressure-responsive strip is arranged over each of the gap areas, the pressure-responsive strip being made of a material which is resiliently-deformable to form an electrical shunt over its overlapping gap area upon the application of sufficient pressure upon the strip portion. A groove is provided transversely across a roadway. A resilient, rubber-like material is moulded around the prepared membrane switch to embed the membrane switch within an elongated, relatively narrow block which is of a width for fitting within the groove which is formed in the roadway.

(c) Other Features of the Invention

By one feature of the first switch assembly embodiment of this invention, the pair of electrically-conductive stripes are in the form of a printed circuit on the electrically-semiconductive substrate. By a first variation thereof, the printed circuit consists of a repetitive pattern including adjacent strips which are electrically-conductive, but which are separated by a repetitive pattern of electrically-nonconductive gaps. By a second variation thereof, the pattern comprises teeth-like gap portions on a first strip which are meshed with teeth-like portions on the second strip.

By a second feature of the first switch assembly embodiment assembly of this invention, and/or the above feature and/or the above variations thereof, the second member consists of a phosphor bronze strip.

By a third feature of the first switch assembly embodiment of this invention, and/or the above features thereof, and/or the above variations thereof, the membrane switch assembly is in the form of a monolithic unit, wherein a sandwich of the first member and the second member is integrated with a solder mesh, is wrapped with polyester tape, is covered with a vapour barrier and is enclosed in a heat shrunk tubing.

By a fourth feature of the first switch assembly embodiment of this invention, and/or the above features thereof, and/or the above variations thereof, the assembly is provided in the form of a plurality of discrete, but connected sectors, each sector consisting of the above-described first member and the above-described second member.

By a first feature of the second vehicle road sensor embodiment of this invention, in the membrane switch assembly, the pair of electrically-conductive stripes are in the form of a printed circuit on the electrically-semiconductive substrate. By a first variation thereof, the printed circuit consists of a repetitive pattern including adjacent strips which are electrically-conductive, but which are separated by a repetitive pattern of electrically-non conductive gaps. By a second variation thereof, the pattern comprises teeth-like gap portions on a first strip which are meshed with teeth-like portions on the second strip.

By a second feature of the second vehicle road sensor embodiment of this invention, and/or the above feature thereof, and/or the above variations thereof, in the membrane switch assembly, the second member consists of a phosphor bronze strip.

By a third feature of the second vehicle sensor embodiment of this invention, and/or the above features thereof, and/or the above variations thereof, the membrane switch assembly is in the form of a monolithic unit wherein a sandwich of the first member and the second member is integrated with a solder mask, is wrapped with polyester tape, is covered with a vapour barrier and is enclosed in a heat shrunk tubing.

By a fourth feature of the second vehicle sensor embodiment of this invention, and/or the above features thereof, and/or the above variations thereof, the block is formed in the shape of an elongated, narrow, generally-uniform cross-section, with the sensing area extending across a substantial upper portion of the length of the elongated block.

By a fifth feature of the second vehicle sensor embodiment of this invention, and/or the above features thereof, and/or the above variations thereof, the block is closely fitted with an elongated, metal open top frame which exposes the contact surface of the block, but covers, in face to face contact, the side and lower surfaces which define the elongated block.

By a sixth feature of the second vehicle sensor embodiment of this invention, and/or the above features thereof, and/or the above variations thereof, the block is made of a rubbery urethane polymer.

By a seventh feature of the second vehicle sensor embodiment of this invention, and/or the above features thereof, and/or the above variations thereof, the sensor is sufficiently narrow to fit closely within a relatively-narrow groove in the surface of a road, the groove being of a depth which is sufficient to expose only the upper contact surface of the block, and the vehicle road sensor is formed with means for interlocking at least one of walls defining the vehicle road sensor with an adjacent block surface which it overlaps.

By an eighth feature of the second vehicle sensor embodiment of this invention, and/or the above features thereof, and/or the above variations thereof, the block is arranged within a substantially uniform-cross-section, saw-cut like groove which is formed in the surface of a road, with the groove being of a depth which is substantially-equal to the height of the block for exposing the upper surface of the block at the road surface.

By a ninth feature of the second vehicle sensor embodiment of this invention, and/or the above features thereof, and/or the above variations thereof, an adhesive material is applied within the groove for immovably securing the block within the groove.

By a tenth feature of the second vehicle sensor embodiment of this invention, and/or the above features thereof, and/or the above variations thereof, the vehicle road sensor is provided as a plurality of sensors arranged side-by-side across the roadway and interconnected to an electrical circuit system.

By an eleventh feature of the second vehicle sensor embodiment of this invention, and/or the above features thereof, and/or the above variations thereof, each sensor is provided in the form of a plurality of discrete, but connected sectors, each sector consisting of the above-described first member and the above-described second member.

By a first feature of the third vehicle sensor embodiment of this invention, the block is closely fitted within an open top metal frame which extends and embraces substantially the full length of the block, and the vehicle sensor includes a suitable holder for holding the block within the frame so that the upper surface of the block is exposed through the open top of the frame wherein the tires of a vehicle will compress the block downwardly to apply the pressure.

By a second feature of the third vehicle sensor embodiment of this invention, and/or the above feature thereof, the vehicle road sensor is provided as a plurality of sensors arranged side-by-side across the roadway and interconnected to an electrical circuit system.

By a third feature of the third vehicle sensor embodiment of this invention, and/or the above features thereof, each sensor is in the form of a plurality of discrete, but connected sectors, each sector consisting of the above-described first member and the above-described second member.

By a first feature of the fourth method embodiment of this invention, the method includes the steps of arranging the sensor within an elongated, open top metal frame, and securing the rubber-like material in the frame so that the channel forms a receptacle, as well as a support for the finished sensor.

By a second feature of the fourth method embodiment of this invention, and/or the above feature thereof, the method includes the step of forming electrical connections between the embedded strips and the exterior of the moulded rubber-like material for use in connection to a source of electrical power.

By a third feature of the fourth method embodiment of this invention, and/or the above features thereof, the method includes the step of preparing the membrane switch sensor in the form of a plurality of discrete, but connected sectors, each sector consisting of the above-described first member and the above-described second member.

By a fourth feature of the fourth method embodiment of this invention, and/or the above features thereof, the method includes the steps of providing a plurality of parallel grooves transversely across a roadway, and moulding a resilient, rubber-like material around an associated prepared membrane switch to embed the associated switch within an associated elongated, relatively-narrow block which is of a width for fitting within an associated groove of the plurality of grooves which are formed in the roadway.

(d) Generalized Description of the Invention

In more general terms, this invention contemplates forming a sensor device with a phosphor bronze membrane, particularly of the type having an elongated, printed circuit with a pattern of spaced-apart gaps between conductive stripes, and with a pressure-responsive strip overlapping the gaps for shunting electricity over the respective gaps in response to applied pressure. The strip is completely embedded within a block of rubbery, synthetic plastic material, e.g., a synthetic urethane-type rubber, which is formed to fit within a metal frame which is set within a roadway, or to fit within a narrow groove which is cut into the surface of a roadway. Pressure of a vehicle upon the exposed upper surface of the block is transmitted to the strip beneath the pressurised area so as to permit the strip momentarily to be electrically conductive. Hence, electrical flow momentarily takes place across the particular gap area that is located beneath the strip with a suitable electrical measuring device, e.g., an ammeter or voltmeter or the like, depending upon circuit arrangements. Moreover, the detected signal can be connected to a computer to determine the location of the pressurised area affected and hence, the location of the vehicle along the length of the sensor.

The sensor which is used for detecting the passage of vehicles over a roadway is preferably formed from a membrane switch which is preferably embedded in a resilient rubber-like block that is moulded around the membrane switch. The sensor is preferably sized to fit within a metal frame which is set into the road surface at right angles to the traffic flow, which is embedded into a narrow saw cut groove cut across the roadway. The face of the sensor at the open top of the frame is exposed at the road surface for contact with the tires of passing vehicles.

The membrane switch is preferably formed of a printed circuit having a pair of separated conductive stripes with a repetitive pattern of gaps between them, and a strip of phosphor bronze foil overlying each of the gap areas to form conductive shunts between the printed conductive stripes. The material forming each of the stripes, in response to physical pressure, becomes a conductor over its respective gap area as a result of the direct pressure from a vehicle tire compressing the resilient material above the conductive phosphor bronze strip and pressing the phosphor bronze strip into direct contact with the stripe. A detector is used to sense the flow of current through the printed circuit to signal the presence of a vehicle.

BRIEF DESCRIPTION OF THE DRAWINGS

In the accompanying drawings.

DESCRIPTION OF PREFERRED EMBODIMENTS

Figure 1:
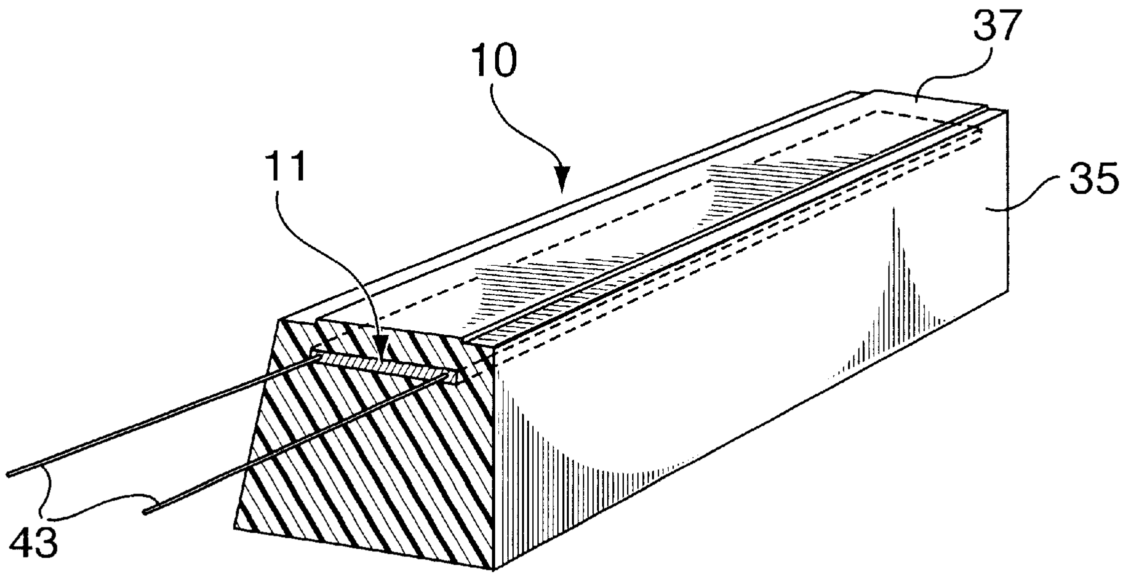
FIG. 1 is a fragmentary perspective view of a sensor of one embodiment of this invention.

(a) Description of FIG. 1

As seen in FIG. 1 the sensor 10 of one embodiment of the present invention includes a membrane switch, generally designated 11, which is embedded in a block 35 of a resilient, rubber-like material, e.g., a polyurethane rubber. Lead wires 43 extend out from the membrane switch 11. The membrane switch 11 is embedded a short distance below the top surface 37 of the block 35.

Figure 2:
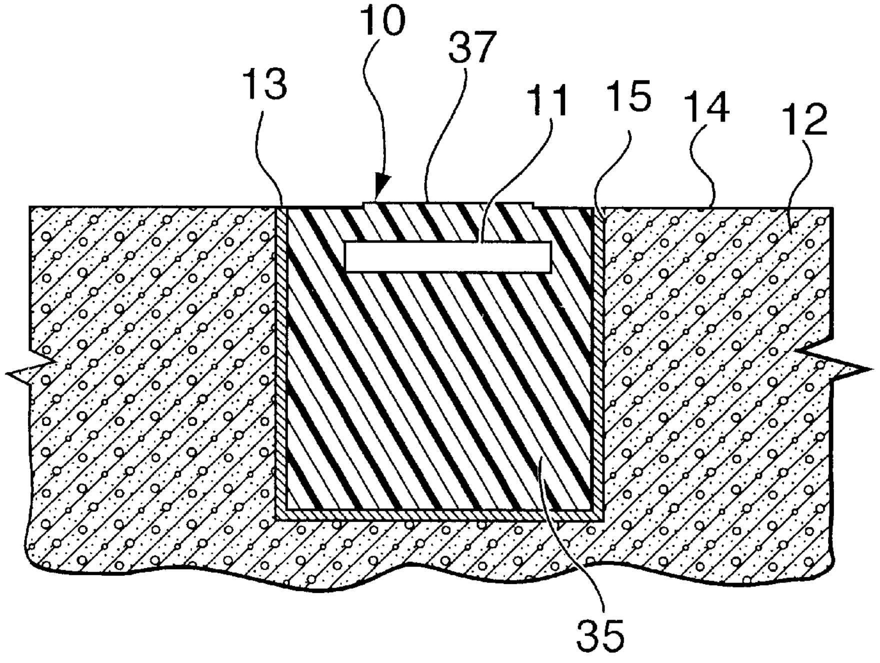
FIG. 2 is a cross-sectional view of a portion of the sensor of one embodiment of this invention arranged within a groove which is formed in a roadway.

(b) Description of FIG. 2

FIG. 2 illustrates sensor 10 which is arranged within a slot of saw-cut like groove 15 which is formed in the upper surface 14 of a road 12. The upper surface 14 may be on a highway 12 or the like where the number of vehicles passing over the road are to be determined. Alternatively, the upper surface 14 may be part of the roadway 12 around a truck weighing station or it may even be within a factory floor, wherein the movement of vehicles or the loads upon vehicles are a matter of concern. Typically, the groove 15 may be formed in the road 12 using a conventional road cutting saw device. The sensor 10 is held within the groove 15 by means of a suitable adhesive 13, e.g., an epoxy resin or a grout.

Figure 3:
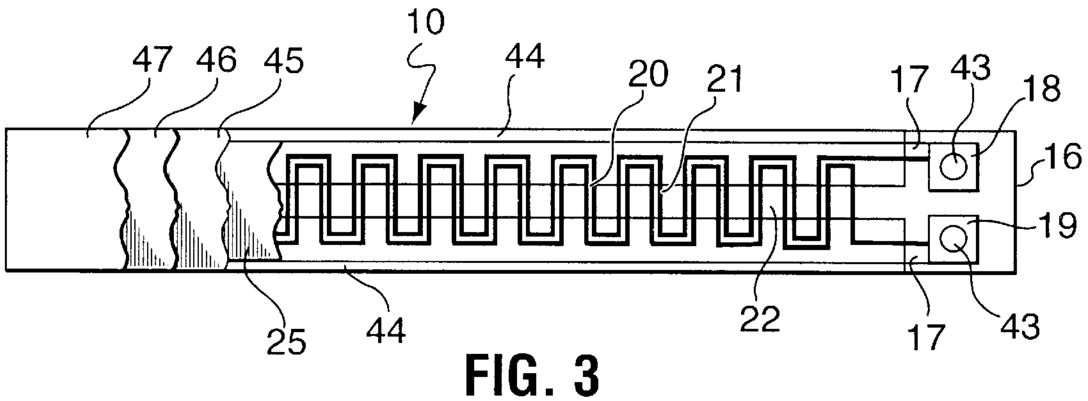
FIG. 3 is a fragmentary, plan view of the sensor of one embodiment of this invention showing the printed circuit section overlapped by the shunt strip portion.

(c) Description of FIG. 3

FIG. 3 shows a detail of the sensor 10. The sensor 10 includes a phosphor bronze membrane switch system, having two major parts. The first major part comprises a nonconductive substrate, 16, upon which a printed circuit coating 17 is applied in the form of stripes 18, 19 which are printed with regular, spaced-apart, patterns of gap areas 20. The gap areas 20 may be formed in various shapes which generally form separated terminals. For illustrative purposes, the gap areas 20 are illustrated as comprising teeth-like portions 21 on the stripe 18 which are meshed with teeth-like portions 22 on the opposite stripe 19. The teeth portions 22 each have a connection lead 43 that is integral with the respective stripe 19 and 18.

The second major part of the membrane switch 10 is a phosphor bronze strip 25. The phosphor bronze strip 25 normally does not conduct electrical current. However, under pressure the phosphor bronze strip 25 will deflect by completing the circuit conduct electrical current across the gap areas which it covers. The phosphor bronze strip 25 may be formed of electrically-conductive phosphor bronze. One example of a suitable phosphor bronze strip is Alloy 510 (spring temper) produced by: ABC Metals Inc., Elmhurst Ill., 60126, USA The printed substrate 16 and the phosphor bronze strip 25 are aligned, and then placed together as a sandwich, with the phosphor bronze strip 25 on top.

A solder mask 44 covers the non-conductive substrate 16 at the lateral edges thereof. A suitable tape 45, e.g., a polyester tape, covers the sandwich of the printed substrate 16 and the phosphor bronze strip 25. Then a suitable vapour barrier 46 is applied over the tape 45. Finally the unit so formed is protected by a heat-shrunk tubing 47.

In order to produce the sensor 10, the force sensing substrate 16 and phosphor bronze strip 25 assembly so formed is then positioned in a mould (not seen). The mould is filled with a resilient rubber-like material, e.g., rubbery urethane, which solidifies to form resilient block 35.

The resilient block 35 enveloping the switch system 10 is contemplated as being moulded within the protective urethane which will maintain the cross-section structure and shape of the strip 11 to form a long, flexible member 35. This member 35 is inserted in a narrow groove 11 which may be saw cut in a roadway 12. The member 35 is held in the groove 11 by a layer 13 of an epoxy resin or similar adhesive or a suitable grout material. Thus, the walls of the groove 11 and the resin function like a channel to reinforce and support the block 35 and to maintain the cross-sectional shape of the block 35.

While not shown, the groove may be fitted with an open topped metal extrusion, which provides the mould for the resilient rubber-like material.

Figure 4:
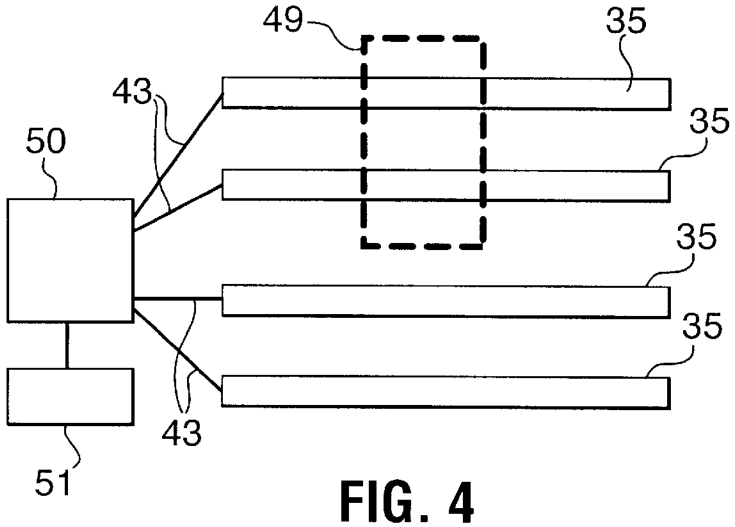
FIG. 4 is a schematic view showing a series of sensors of one embodiment of this invention, arranged side-by-side across a roadway in the surface of a roadway and connected to an indicating device.

(d) Description of FIG. 4

FIG. 4 illustrates an arrangement wherein a plurality of sensor blocks 35 are arranged side by side, each connected by a lead wire to the electrical circuit system which will be described below (namely computer 50 and read-out device 51). In this instance, a vehicle tire, illustrated schematically by the dotted lines 49, will cover two of the sensor blocks 35. Thus, the presence of the tire will cause several of the gap areas to be shunted simultaneously. By properly sensing the number and location of the shunted gap areas, as well as the number of sensors which are covered by the tire, the tire presence on the road may be determined.

When pressure is applied to the contact surface 37 of the sensor, the electrically-conductive strip 25 makes contact, so that current will flow through it so that it may shunt current across the meshed teeth 21 and 22 and through the stripes 18 and 19. An electrical potential is normally applied across the leads 43. For the purposes of this sensor block 35, the potential may be very low, e.g., of the order of 5 to 15 volts with a low current flow.

Figure 5:
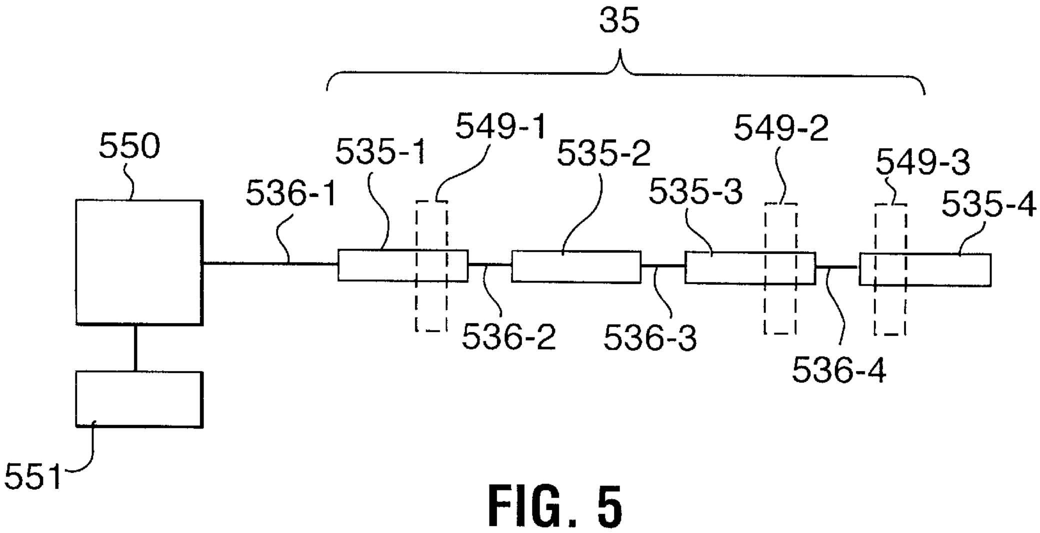
FIG. 5 is a schematic view showing a series of sensors of a second embodiment of this invention, including discrete, but connected, sensitive zones along the length of the sensor, arranged lengthwise, the sensor being disposed across the roadway in the surface of a roadway and connected to an indicating device.

(e) Description of FIG. 5

FIG. 5 illustrates an arrangement wherein sensor block 35 consists of a plurality of distinct, but connected, sensor areas 535-1, 535-2, 535-3, 535-4. Sensor areas 535-2, 535-3, 535-4 are connected in series to the adjacent sensor area by connectors 536-2, 536-3, 536-4, respectively. Sensor area 535-1 is connected by a lead wire 536-1 to the electrical circuit system which will be described below (namely computer 530 and read-out device 551). As shown, a vehicle tire, illustrated schematically by the dotted lines 549-1, will cover only one of the sensor 535-1 of the sensor block 35. Thus, the presence of the tire 549-1 will cause only one of the gap areas in sensor area 535-1 to be shunted. By properly sensing the shunted gap areas, as well as the number of sectors of the sensors which are covered by the tire 549-1, the presence of a single tire on the road may be determined. Also shown are two vehicle tires 549-2, 549-3 which cover two of the sensor sectors 535-3, 534-4. The presence of the two tires 549-2, 549-3, will thus cause several of the gap areas in sensor sectors 535-3, 535-4 to be shunted simultaneously. By properly sensing the number and location of the shunted gap areas, as well as the number of the sectors of the sensors, which are covered by the tires 549-2, 549-3, the presence of dual tires on the road may be determined.

When pressure is applied of the contact surface 37 of the sensor, the electrically-conductive strip 25 makes contact, so that current will flow through it so that it may shunt current across the meshed teeth 21 and 22 and through the stripes 18 and 19. An electrical potential is normally applied across the leads 43. For the purposes of this sensor block 35 consisting of four sectors 535-1, 535-2, 535-3, 5354, the potential may be very low, e.g., of the order of 5 to 15 volts with a current flow (f) Description of FIG. 6

Figure 6:
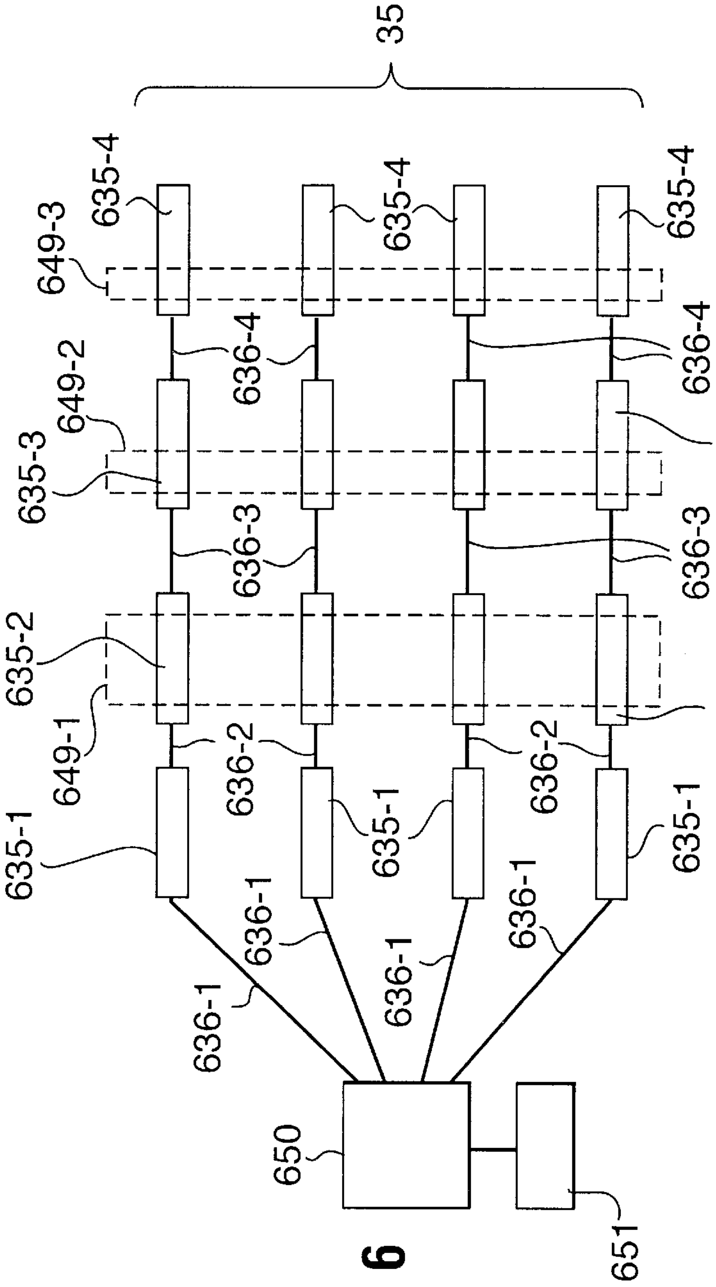
FIG. 6 is a schematic view showing a plurality of sensors of a third embodiment of this invention, each sensor including discrete, but connected, sensitive zones along the length of the sensor, each sensor being arranged lengthwise, the plurality of sensors being arranged side-by-side across a roadway, in the surface of a roadway and connected to an indicating device.

FIG. 6 illustrates an arrangement wherein a plurality of sensor blocks 35 are arranged side by side, each connected by a lead wire 636-1, 636-2, 636-3, 636-4, to the electrical circuit system which will be described below, (namely computer 650 and read out device 651). Each of the plurality of sensor blocks 35 consist of distinct, but connected, sensor areas 635-1, 635-2, 635-3, 635-4. Sensor areas 635-2, 635-3, 635-4 are connected in series to the adjacent sensor area by connectors 636-2, 636-3, 636-4, respectively. Sensor area 635-1 is connected to computer 650 by lead wire 636-1. As shown, a vehicle tire, illustrated schematically by the dotted lines 649-1, will cover only one of the sensor sectors 635-2 of the four sensors 35. Thus, the presence of the tire 649-1 will cause only one of the gap areas in sensor areas 635-2 of the four sensor blocks 35 to be shunted simultaneously. By properly sensing the shunted gap areas, as well as the number of sectors of the sensors which are covered by the tire 649-1, the presence of a single tire on the road carried by a single axle may be determined. Also shown are two vehicle tires 649-2, 649-3 which cover two of the sensor sectors 635-3, 635-4 of each of the four sensors 35. The presence of the two tires 649-2, 649-3, will cause several of the gap areas in sensor sectors 635-3, 635-4 of each of the four sensors 35 to be shunted simultaneously. By properly sensing the number and location of the shunted gap areas, as well as the number of the sectors of the sensors, which are covered by the tires 649-2, 649-3, the presence of dual tires mounted on a double bogey axle on the road may be determined. Thus, since tires 649-2, 649-3 extends over the sensor sector 635-3, 635-4 of the four sensors 35, it can be determined that the truck has a double bogey axle. However, since tire 649-1 extends only over the sensor sector 635-2 of the four sensors 35, it can be determined that the truck has a single axle.

When pressure is applied of the contact surface 37 of the sensor, the electrically-conductive strip 25 makes contact, so that current will flow through it so that it may shunt current across the meshed teeth 21 and 22 and through the stripes 18 and 19. An electrical potential is normally applied across the leads 43. For the purposes of this sensor block 35 consisting of four sectors 635-1, 635-2, 635-3, 635-4, the potential may be very low, e.g., of the order of 5 to 15 volts with a low current flow The electrical circuit system may vary considerably and, therefore, a schematic circuit is shown in FIG. 5 as a highly simplified example. In actual use, a more complete circuit, with appropriate readouts, indicators and the like, would be used. However, as this forms no part of the invention, a simplified circuit is shown in order to explain the operation. Those skilled in the art can readily select appropriate, commercially-available electrical components and circuits to perform the function.

Figure 7:
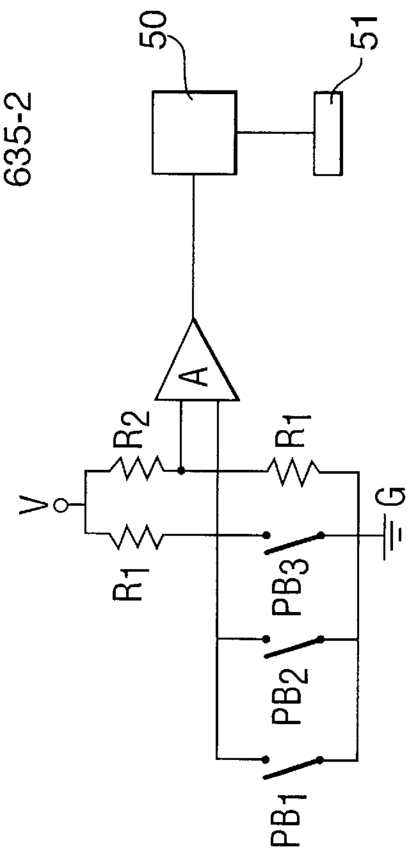
FIG. 7 is a schematic view of a simplified circuit diagram embodying a sensor of one embodiment of this invention.

(g) Description of FIG. 7

FIG. 7 illustrates a series of three sensors blocks, identified by the terms $PB_1$, $PB_2$ and $PB_3$. These sensors blocks are connected into the circuit, which has a low voltage input V and a ground G with voltage divider resistors, schematically illustrated as $R_1$, $R_2$, and $R_3$. The circuit is connected to a conventional operational amplifier A, which in turn is connected to a data processing system.

The data processing system may include a computer 50 which is connected to a readout device 51, e.g., a printer or monitor, etc. (see also FIG. 4). The computer 50 may be programmed simply to pick up the signals caused by the electrical flow through the printed circuit stripes 18 and 19 when the relevant portions of the strip 25 are compressed to become electrically-conductive. In that instance, the signal can be read through the signalling device 51 to determine or to record the passage of a vehicle over the sensor.

In operating the sensor, the readout can be in the form-either of screen visible numbers or graphics, or printed series of numbers or graphics which indicate vehicle passage. In addition, the sensor can be used as a control for operating other devices, e.g., light signals, stop and go signals of various kinds, etc. Because of its complete encapsulation within the mass of the resilient material, the switch system is impervious to the atmosphere and to destructive environmental conditions, which are found on roadways. For example, commonly applied snow melting salts, acidic rain, debris, road tar, oil and gas and the like will not affect the membrane switch system because it is totally protected by the thick resilient moulding. The cross-sectional shape and the resiliency of the moulding transmits vehicle pressure downwardly, substantially uni-directionally, to produce the sensing effect. Various arrangements of separate, but connected sensitive zones may be provided along the length of the sensor. Vehicle wheels of different widths would activate a different number of active sections, thereby approximating tire widths, for detecting the presence of one tire or two tires.

(7) CONCLUSION

From the foregoing description, one skilled in the art can easily ascertain the scope of the present invention, and without departing from the spirit and scope thereof, can make various changes and modifications of the invention to adapt it to various usages and conditions. Consequently, such changes and modifications are properly, equitably and "intended" to be, within the full range and equivalence of the following claims.

What is claimed is:

1. An improvement in a membrane switch assembly for embedment within a block which is formed of a resilient, rubber-like material, for use in a vehicle road sensor for signalling the passage at a vehicle over a predetermined location on a roadway, said membrane switch comprising:

(I) a first member comprising
(i) a non-conductive substrate,
(ii) a pair of electrically-conductive stripes upon said non-conductive substrate,
(iii) at least one electrically non-conductive gap separating said electrically-conductive stripes, and
(iv) an electrically-conductive lead connected to each said electrically-conductive stripe; and
(II) a second member comprising an electrically-conductive strip which is superposed upon said electrically-conductive stripes on said first member;

wherein (III) said second member is normally out of electrical contact with said electrically-conductive stripes on said first member, but said second member being sufficiently flexible, so that, under a compressive load, it deflect to shunt across said electrically non-conductive gap, thereby to permit electric current to flow from said electrically conductive stripes to said second member.

2. The membrane switch assembly as claimed in claim 1, wherein said pair of electrically-conductive stripes are in the form of a printed circuit on said non-conductive substrate.

3. The membrane switch assembly as claimed in claim 2, wherein said printed circuit consists of a repetitive pattern including adjacent strips which are electrically-conductive, but which are separated by a repetitive pattern of electrically-nonconductive gaps.

4. The membrane switch assembly as claimed in claim 3, wherein said pattern comprises teeth-like gap portions on one strip which are meshed with teeth-like portions on the second strip.

5. The membrane switch assembly as claimed in claim 1, wherein said second member consists of a phosphor bronze strip.

6. The membrane switch assembly as claimed in claim 1, in the form of a monolithic unit wherein a sandwich of said first element and said second element is integrated with a solder mask, is wrapped with polyester tape, is covered with a vapour barrier and is enclosed in a heat shrunk tubing.

7. The membrane switch assembly as claimed in claim 1, in the form of a plurality of discrete, but connected sectors, each sector consisting of said first member and said second member.

8. A vehicle road sensor for signalling the passage of a vehicle over a predetermined location on a roadway, said vehicle road sensor comprising:

(A) a membrane switch which is completely embedded with a block which is formed of a resilient, rubber-like material, said block having an upper, contact surface, with said membrane switch being embedded within said block beneath the contact surface so that vehicle pressure upon said contact surface is transmitted to the upper surface of said membrane switch; wherein said membrane switch comprises
(I) a first member comprising
(i) a non-conductive substrate,
(ii) a pair of electrically-conductive stripes upon said non-conductive substrate,
(iii) at least one electrically non-conductive gap separating said electrically-conductive stripe, and
(iv) an electrically-conductive lead connected to each said electrically-conductive stripe;
(II) a second member comprising an electrically-conductive strip superposed upon said electrically conductive stripes on said first member; and a connection for applying an electrical potential to the membrane switch wherein said electrical potential is applied to said second member; and a detector for detecting the flow of current through the membrane switch;
(III) said second member normally being out of electrical contact with said electrically-conductive stripes on said first member, but said second member being sufficiently flexible, so that, under a compressive load, it deflect to shunt across said electrically-conductive gap and to permit electric current to flow from said electrically conductive stripes to said second member;
(B) wherein said block-forming material between said contact surface of said block and said second member is sufficiently resiliently-compressible under the weight of a vehicle for temporarily applying enough pressure to the portion of the strip so that it temporarily functions as a shunt across the electrically-conductive strips of the first member so that electrical current temporarily flows through the membrane switch for indicating the temporary presence of a vehicle upon the block contact surface.

9. The vehicle road sensor of claim 8, wherein, in said membrane switch assembly, said pair of electrically-conductive stripes are in the form of a printed circuit on said non-conductive substrate.

10. The vehicle road sensor of claim 9, wherein, in said membrane switch assembly, said printed circuit consists of a repetitive pattern including adjacent strips which are electrically-conductive, but which are separated by a repetitive pattern of electrically-nonconductive gaps.

11. The vehicle road sensor of claim 10, wherein, in said membrane switch assembly, said pattern comprises teeth-like gap portions on one strip which are meshed with teeth-like portions on the second strip.

12. The vehicle road sensor of claim 8, wherein, in said membrane switch assembly, said second member consists of a phosphor bronze strip.

13. The vehicle road sensor of claim 8, wherein, said membrane switch assembly is in the form of a monolithic unit wherein a sandwich of said first element and said second element is integrated with a solder mask, is wrapped with polyester tape, is covered with a vapour barrier and is enclosed in a heat shrunk tubing.

14. The vehicle road sensor as claimed in claim 8, wherein said block is formed in the shape of an elongated, narrow, generally-uniform cross-section, with a sensing area extending across a substantial upper portion of the length of the elongated block.

15. The vehicle road sensor as claimed in claim 8, wherein said block is closely fitted within an elongated, metal open top frame which exposes the contact surface of the block, but covers, in face-to-face contact, the side and lower surfaces which define the elongated block.

16. The vehicle road sensor as claimed in claim 8, wherein said block is made of a rubbery urethane polymer.

17. The vehicle road sensor as claimed in claim 8, wherein said vehicle road sensor is sufficiently narrow to fit closely within a relatively-narrow groove in the surface of a road, said groove being of a depth to expose only the upper contact surface of said block; and wherein said vehicle road sensor is formed with structure for interlocking at least one of walls defining said vehicle road sensor with an adjacent block surface which it overlaps.

18. The vehicle road sensor as claimed in claim 8, wherein said block is arranged within a substantially-uniform-cross-section, saw-cut like groove which is formed in the surface of a road, with said groove being of a depth which is substantially-equal to the height of said block for exposing the upper surface of the block at the road surface.

19. The vehicle road sensor as claimed in claim 8, including an adhesive material applied within said groove for immovably securing the block within the groove.

20. The vehicle road sensor as claimed in claim 8, as a plurality of sensors which are arranged side-by-side across the roadway and which are interconnected to an electrical circuit system.

21. The vehicle road sensor as claimed in claim 8, wherein each said sensor is in the form of a plurality of discrete, but connected sectors, each sector consisting of said first member and said second member.

22. A vehicle road sensor for signalling the passage of a vehicle over a predetermined location on a roadway, said vehicle road sensor comprising:

a conductive membrane switch which is formed of an elongated printed circuit pattern upon a substrate, said printed circuit pattern including a pair of separated conductive printed strips and a series of gap areas formed between said strips, with said strips being arranged for normal connection to a source of electrical power, and a pressure-responsive strip portion overlapping each gap area, said pressure-responsive strip being formed of a material which is normally electrically-conductive so that each strip forms an electrical shunt over its overlapping gap area upon the application of sufficient pressure upon the strip;

said relatively-narrow membrane switch being embedded within an elongated, relatively-narrow block which is made of a resilient, rubber-like material;

said block being of a cross-sectional size to fit closely within a saw-cut which is made in a roadway surface so that wheels of a vehicle running over said block apply sufficient pressure upon said block to compress it and thereby to apply sufficient pressure to those strips which are located beneath the tires, to shunt across said gaps and to permit electrical current to flow across said gaps which they overlap and through the strips for detection by a detection means.

23. A vehicle road sensor as claimed in claim 22, wherein said block is closely-fitted within an open top metal frame which extends along, and embraces, substantially the full length of, said block; and a suitable holder for holding said block within said frame so that the upper surface of said block is exposed through the open top of said frame, wherein tires of a vehicle will compress the block downwardly to apply said pressure.

24. The vehicle road sensor as claimed in claim 22, as a plurality of sensors which have arranged side-by-side across the roadway and which are interconnected to an electrical circuit system.

25. The vehicle road sensor as claimed in claim 22, wherein each said sensor is in the form of a plurality of discrete, but connected sectors, each sector consisting of said first member and said second member.

26. A method for making a vehicle road sensor comprising the steps of:

preparing a membrane switch from an elongated, narrow substrate having a printed repetitive circuit pattern including elongated electrically conductive strips which are separated by defied gap areas, with a pressure-responsive strip arranged over each of said gap areas, said pressure-responsive strip being made of a material which is resiliently-deformable to form an electrical shunt over its overlapping gap area upon the application of sufficient pressure upon said pressure-responsive strip;

providing a groove transversely across a roadway; and moulding a resilient, rubber-like material around the prepared membrane switch to embed said switch within an elongated, relatively narrow block which is of a width for fitting within said groove which is formed in said roadway.

27. The method for making a vehicle road sensor as claimed in claim 26, and including the steps of: arranging said sensor within an elongated, open top metal frame channel; and securing said rubber-like material in the frame so that said channel forms a receptacle, as well as a support for the finished sensor.

28. The method for making a vehicle road sensor as claimed in claim 26, including the step of: forming electrical connections between embedded strips and the exterior of the moulded rubber-like material for use in connection to a source of electrical power.

29. The method as claimed in claim 26, including the step of preparing said membrane switch in the form of a plurality of discrete, but connected sectors, each sector consisting of said first member and said second member.

30. The method as claimed in claim 26, including the steps of providing a plurality of parallel grooves transversely across a roadway; and moulding a resilient, rubber-like material around an associated prepared membrane switch to embed said associated switch within an associated elongated, relatively narrow block which is of a width for fitting within an associated said groove of said plurality of grooves which are formed in said roadway.

* * * * *